United States Patent
Kim et al.

(10) Patent No.: US 10,309,321 B2
(45) Date of Patent: Jun. 4, 2019

(54) ACCELERATION CONTROL METHOD THROUGH THROTTLE DUALIZATION AND VEHICLE USING THE SAME

(71) Applicants: Hyundai Motor Company, Seoul (KR); Kia Motors Corporation, Seoul (KR)

(72) Inventors: Dong-Sun Kim, Seoul (KR); Su-Yeong Jang, Seongnam-si (KR); Min-Gyu Jung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 20 days.

(21) Appl. No.: 15/852,782

(22) Filed: Dec. 22, 2017

(65) Prior Publication Data

US 2019/0003399 A1    Jan. 3, 2019

(30) Foreign Application Priority Data

Jun. 29, 2017 (KR) .................. 10-2017-0082373

(51) Int. Cl.
| | |
|---|---|
| *F02D 9/02* | (2006.01) |
| *F02D 11/02* | (2006.01) |
| *F02D 11/10* | (2006.01) |
| *F02B 37/18* | (2006.01) |
| *F02B 37/24* | (2006.01) |

(52) U.S. Cl.
CPC .............. *F02D 9/02* (2013.01); *F02B 37/18* (2013.01); *F02B 37/24* (2013.01); *F02D 11/02* (2013.01); *F02D 11/105* (2013.01); *F02D 2009/0213* (2013.01); *F02D 2009/0228* (2013.01); *F02D 2200/021* (2013.01); *F02D 2200/101* (2013.01)

(58) Field of Classification Search
CPC .......... F02D 9/02; F02D 11/02; F02D 11/105; F02D 2009/0213; F02D 2009/0228; F02D 2200/021; F02D 2200/101; F02B 37/18; F02B 37/24
USPC ....................................................... 701/104
See application file for complete search history.

(56) References Cited

U.S. PATENT DOCUMENTS

| | | | | |
|---|---|---|---|---|
| 4,640,243 A | * | 2/1987 | Abo ............... | F02D 11/105 123/361 |
| 4,727,838 A | * | 3/1988 | Oshiage .......... | F02D 11/105 123/361 |
| 4,799,467 A | * | 1/1989 | Ishikawa ........ | F02D 11/105 123/399 |

FOREIGN PATENT DOCUMENTS

| | | |
|---|---|---|
| JP | 2005-098250 A | 4/2005 |
| JP | 2016-065484 A | 4/2016 |

\* cited by examiner

*Primary Examiner* — Mahmoud Gimie
(74) *Attorney, Agent, or Firm* — Morgan, Lewis & Bockius LLP (57) ABSTRACT

An acceleration control method through throttle dualization may include detecting a signal of an accelerator pedal scope (APS) by pressing of an accelerator pedal while a vehicle travels determines, by an electronic controller, whether the APS is rapidly changed, performing a first throttle response mode in which acceleration control is performed using a current intake manifold pressure when the APS is not determined to be rapidly changed, and performing a second throttle response mode in which acceleration control is performed using a target intake manifold pressure when the APS is determined to be rapidly changed.

18 Claims, 7 Drawing Sheets

ACCELERATION CONTROL METHOD THROUGH THROTTLE DUALIZATION AND VEHICLE USING THE SAME

CROSS-REFERENCE TO RELATED APPLICATIONS

The present application claims priority to Korean Patent Application No. 10-2017-0082373, filed on Jun. 29, 2017, the entire contents of which is incorporated herein for all purposes by this reference.

BACKGROUND OF THE INVENTION

Field of the Invention

The present invention relates to an acceleration control method; and, more, to a vehicle using an acceleration control method through throttle dualization, which satisfies both rapid response and stability of a throttle valve together.

Description of Related Art

A driver's accelerator pedal operation reflects a driver's acceleration intention in a vehicle by increasing engine power, which is referred to as acceleration control.

To this end, an engine system includes an electronic control unit (ECU), an accelerator pedal, a throttle valve, an intake/exhaust valve, a fuel injector, an igniter, and a wastegate turbocharger (WGT) or a variable geometry turbocharger (VGT), and performs acceleration control by the control of the ECU. Here, each of the WGT and the VGT is a turbo-bypass air regulator. Especially, the WGT may obtain a more optimal boost pressure in the entire RPM region of an engine by variably operating a pass area of exhaust gas introduced into a turbine, whereas the VGT may obtain a low-speed torque margin while aiming at high torque and high power.

For example, when a driver presses an accelerator pedal, an ECU detects a driver's acceleration intention in a response to the signal of an accelerator pedal detector or accelerator pedal scope (APS). As such, the ECU controls opening of a throttle valve based on the APS for acceleration control, adjusts an opening and closing time of an intake/exhaust valve, adjusts a fuel amount of injection in a fuel injector, adjusts an ignition time of an igniter, and adjusts an amount of turbo-bypass air of a WGT or a VGT to increase engine power.

The ECU enables the rapid response of the throttle valve on the basis that the increasing rate of air supplied to a cylinder is determined by the opening speed of the throttle valve according to the driver's accelerator pedal operation, with the consequence that acceleration response is rapidly controlled.

However, the acceleration control leaning on the rapid response of the throttle valve causes a side effect of unstable engine power.

This side effect may include, for example, a phenomenon in which the throttle valve excessively vibrates when the engine idles or the accelerator pedal is operated in the state in which the driver's acceleration intention is low, and as a result the engine power is unstable. This the unstable engine power may serve as dissatisfaction of drivers.

Therefore, it is necessary to execute rapid acceleration response through the rapid response of the throttle valve during acceleration control and to simultaneously prevent the excessive vibration of the throttle valve, which leads to the unstable engine power, under any engine condition.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an acceleration control method through throttle dualization, configured for executing rapid acceleration response through rapid response of a throttle while resolving unstable engine power due to excessive vibration of the throttle valve through stability of the throttle valve, of basically resolving dissatisfaction of a driver by separately controlling the response state of the throttle valve using an APS variation by the driver Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, an acceleration control method through throttle dualization may include (A) monitoring data of a driving condition according to traveling of a vehicle by an ECU and detecting a signal of an APS by pressing of an accelerator pedal, (B) detecting an acceleration response improvement condition of the vehicle when the APS is detected, and determining that the APS is rapidly changed after the acceleration response improvement condition is satisfied, (C) determining a second throttle response parameter according to a desired intake manifold pressure when the APS is determined to be rapidly changed whereas determining a first throttle response parameter according to a current intake manifold pressure when the APS is determined to not be rapidly changed, (D) determining a second required throttle opening for throttle response using the second throttle response parameter or a first required throttle opening for throttle stability using the first throttle response parameter, and (E) performing the acceleration control in a second throttle response mode that controls the throttle valve by the required throttle opening for throttle response or performing the acceleration control in a first throttle response mode that controls the throttle valve by the required throttle opening for throttle stability.

The driving condition may include an engine coolant temperature, an engine revolution per minute (RPM), a throttle valve operation time, a throttle valve opening angle, a flow rate of air, an intake manifold pressure, pressures at front and rear end portions of the throttle valve, an air amount, an intake air temperature, and a throttle valve flow rate. The acceleration response improvement condition may include an engine cold state, an engine speed, and an acceleration control operation, and the acceleration response improvement condition may not be satisfied when an engine is cold or idles, or the acceleration control is performed. The acceleration response improvement condition may include a desired air amount and a reference value for opening of the throttle valve, and the acceleration response improvement condition may not be satisfied when the desired air amount is exceeded or the throttle valve is open by more than the reference value.

The determining that the APS is rapidly changed may include (b-1) determining an APS variation to a current APS value, and (b-2) determining the rapid APS change by a rapid APS change index for the APS variation. The APS variation may be an APS increment per hour, and the rapid APS change index may be determined from a map of the current APS value and the APS variation.

The second throttle response parameter may be a desired throttle opening which is a desired throttle opening determination value for response improvement according to the desired manifold pressure. Furthermore, the second throttle response parameter may include a desired throttle opening which is a desired throttle opening determination value for response improvement according to the desired manifold pressure, a throttle delay time which is a throttle delay time determination value for response improvement according to the rapid APS change, an air regulator control speed which is an air regulator control speed determination value for response improvement according to the rapid APS change, and a desired throttle angle filtering time constant which is a desired throttle angle filtering time constant determination value for response improvement according to the rapid APS change.

The second required throttle opening for throttle response may be determined by applying a flow velocity correction value, a flow rate correction value, and a throttle front-end pressure correction value to a required air amount.

The determination value of the first throttle response parameter may be greater than the second throttle response parameter determination value according to the throttle response mode.

In accordance with various exemplary embodiments of the present invention, a vehicle may include an ECU configured to detect an APS by pressing of an accelerator pedal while the vehicle travels, to determine whether the APS is rapidly changed after determining an acceleration response improvement condition by an engine cold state, an engine speed, a desired air amount, and a reference value for opening of a throttle valve, to determine a desired throttle opening, a throttle delay time, an air regulator control speed, and a throttle angle filtering time constant according to a second throttle response mode using a desired intake manifold pressure when the acceleration response improvement condition is satisfied or the APS is determined to be rapidly changed or to determine a desired throttle opening, a throttle delay time, an air regulator control speed, and a throttle angle filtering time constant according to a first throttle response mode using a current intake manifold pressure when the acceleration response improvement condition is not satisfied or the APS is determined to not be rapidly changed, and to perform acceleration control in the throttle response mode or the throttle stability mode, and an engine system including the throttle valve which is controlled by the ECU and is provided in an intake manifold.

The ECU may be connected to a mode control map, and an intake manifold pressure, pressures at front and rear end portions of the throttle valve, an air amount, an intake air temperature, a throttle valve flow rate, a throttle valve angle, and an operation time for response improvement may be input, as data, to the mode control map.

The engine system may further include an air regulator that reduces a difference between a desired air amount and a current air amount in the intake manifold. The air regulator may be a wastegate turbocharger (WGT) or a variable geometry turbocharger (VGT).

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings. The present invention may, however, be embodied in different forms and should not be construed as limited to the exemplary embodiments set forth herein. Rather, these embodiments are provided so that the present disclosure will be thorough and complete, and will fully convey the scope of the present invention to those skilled in the art. Throughout the disclosure, like reference numerals refer to like parts throughout the various figures and embodiments of the present invention.

Figure 1:
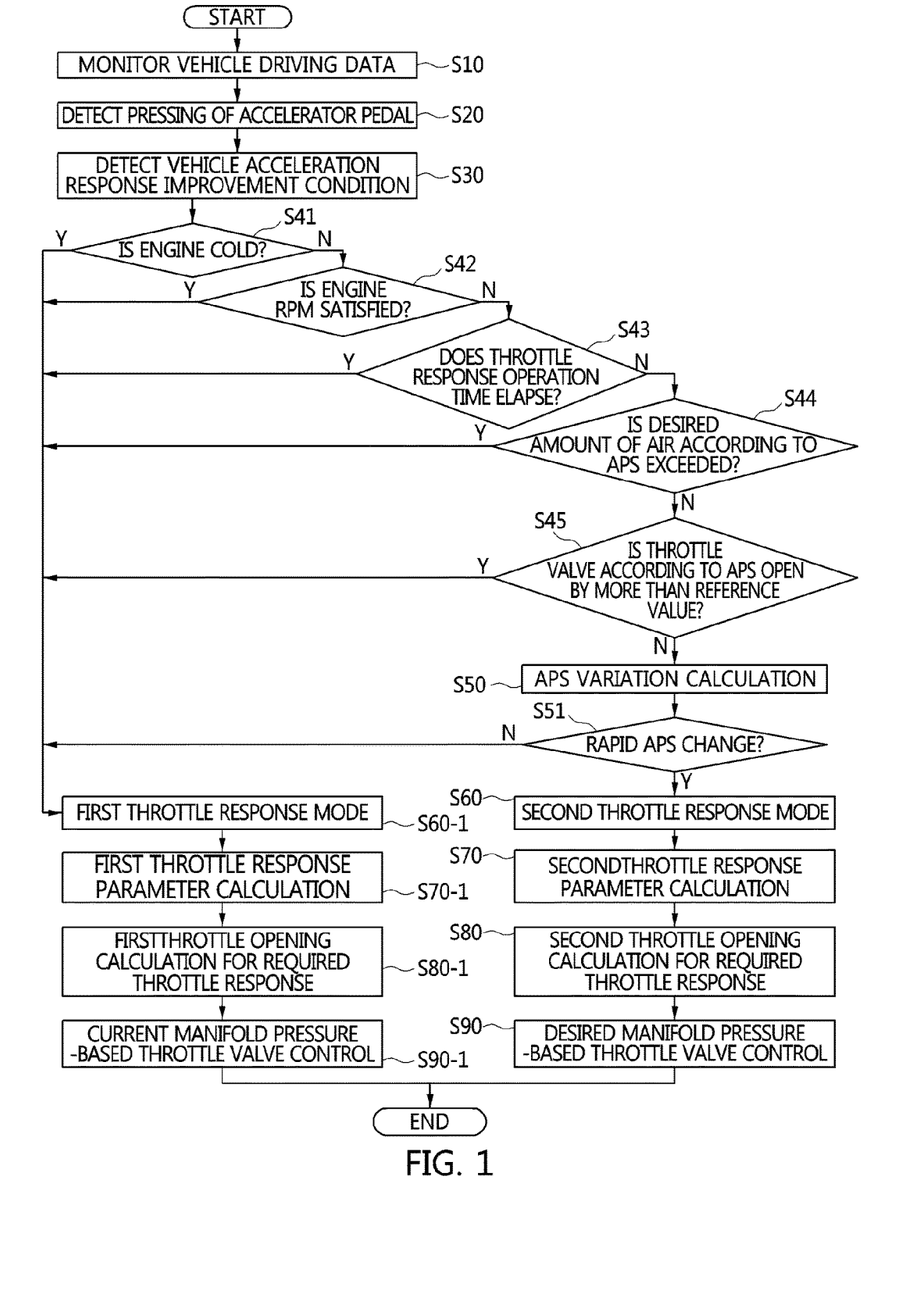
FIG. 1 is a flowchart illustrating an acceleration control method through throttle dualization according to an exemplary embodiment of the present invention.

Referring to FIG. 1, an acceleration control method through throttle dualization determines whether a throttle response improvement is required from the driving condition of a vehicle (S30 to S45) when acceleration control is performed by pressing an accelerator pedal by a driver (S20). As a result of determination, in the driving condition that the throttle response improvement is not required, the process enters a first throttle response mode (S60-1). On the other hand, in the driving condition that the throttle response improvement is required, the process enters a second throttle response mode (S60) after again checking the demand for throttle response improvement due to a rapid APS change according to the pressing of the accelerator pedal.

As a result, the acceleration control method through dualization may provide rapid engine response to a driver's acceleration demand by performing rapid throttle response through acceleration control in the second throttle response mode for the driver's acceleration intention, whereas it may prevent excessive throttle vibration causing unstable engine power by preventing a throttle valve from moving too fast through acceleration control in the first throttle response mode for the driver's acceleration intention.

Figure 2:
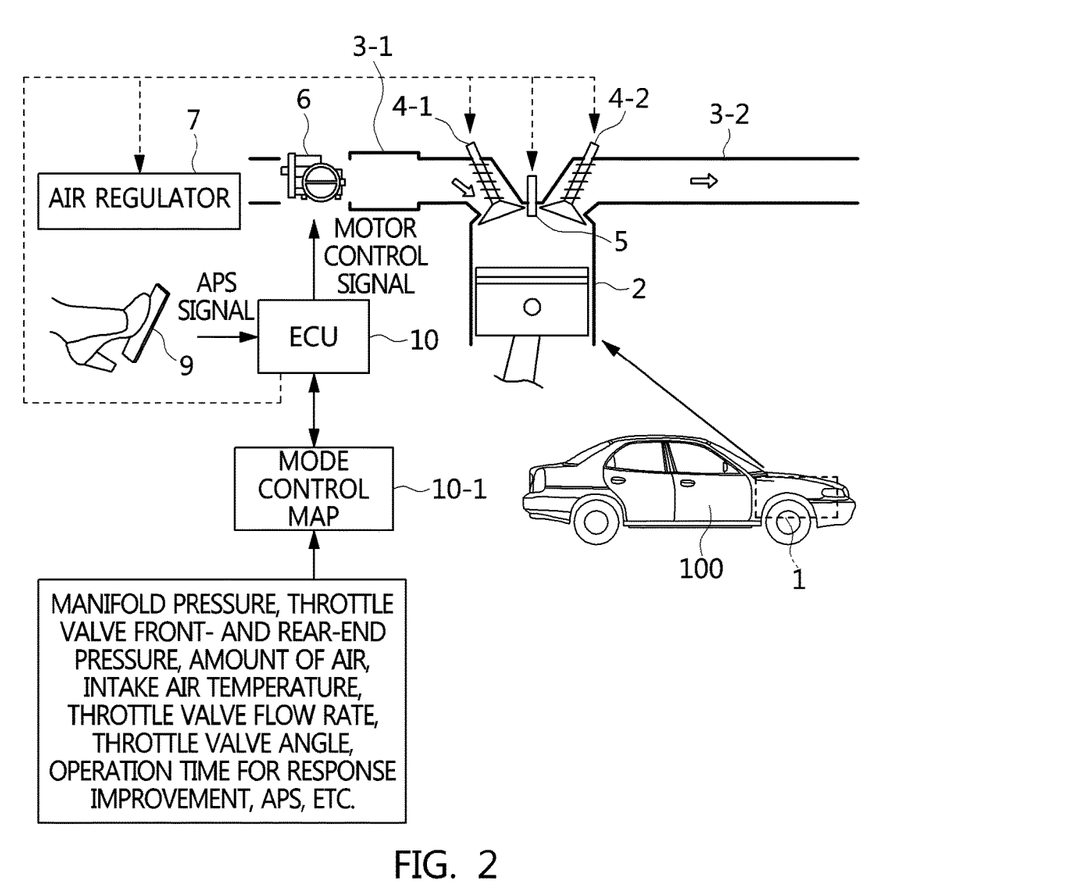
FIG. 2 is an example of a vehicle using the acceleration control method through throttle dualization according to the exemplary embodiment of the present invention.

Referring to FIG. 2, a vehicle 100 includes an engine system 1, and an electronic control unit (ECU) 10 having a mode control map 10-1.

For example, the engine system 1 includes an engine 2 having a cylinder in which combustion is performed by the operation of an intake valve 4-1, an exhaust valve 4-2, and an igniter 5, an intake manifold 3-1 that supplies the cylinder with a mixture of fuel injected into a fuel injector and outside air, an exhaust manifold 3-2 that discharges exhaust gas to the outside, a throttle valve 6 which is disposed in the intake manifold 3-1 to open or close the path of the mixture, and an air regulator 7 which is disposed in the intake manifold 3-1 to control the air flow supplied to the exhaust manifold 3-2. Here, the air regulator 7 is a turbocharger, a WGT, or a VGT.

For example, the ECU 10 is connected to the mode control map 10-1, and controls the throttle valve 6 by outputting the required throttle opening (an opening amount or an opening angle) by the APS according to the pressing of the accelerator pedal 9. The mode control map 10-1 receives an intake manifold pressure, throttle valve front- and rear-end pressures, an air amount, an intake air temperature, a throttle valve flow rate, a throttle valve angle, an operation time for response improvement, and an APS as input data, and provides them to the ECU 10. Therefore, the ECU 10 is an engine ECU having the function of the mode control map 10-1.

The ECU 10 or the mode control map 10-1 is classified into a throttle response improvement determination device, a required throttle opening determination device, a throttle response improvement execution device, and a throttle stability execution device configured for dual acceleration control.

The throttle response improvement determination device includes a driving condition determination section 11, a throttle response improvement determination section 12, and a dual acceleration control output section 13, which will be described more specifically with reference to FIG. 3. The required throttle opening determination device includes an intake manifold pressure switching section 14-1 which is connected to a throttle opening determination for response section 14A and a throttle opening determination for stability section 14a, a throttle delay time switching section 14-2 which is connected to a throttle time determination for response section 14B and a throttle time determination for stability section 14b, an air regulator control speed switching section 14-3 which is connected to a response speed determination section 14C and a stability speed determination section 14c, and a filtering time constant switching section 14-4 which is connected to a throttle angle determination for response section 14D and a throttle angle determination for stability section 14d, which will be described more specifically with reference to FIG. 5. The throttle stability execution device includes a required throttle opening determination section 16, which will be described more specifically with reference to FIG. 7.

Hereinafter, the acceleration control method through throttle dualization will be described more specifically with reference to FIG. 2, FIG. 3, FIG. 4, FIG. 5, FIG. 6, and FIG. 7. In the instant case, a control subject will be described to be the engine ECU 10 including the mode control map 10-1 and a control target will be described to be the control of the throttle valve 6 although it includes the intake valve 4-1, the exhaust valve 4-2, the throttle valve 6, and the air regulator 7.

The ECU 10 performs a step of motoring various detector signal values of the traveling vehicle 100 as in S10, a step of detecting the pressing of the accelerator pedal 9 of the vehicle 100 by the ECU 100 as in S20, and a step of detecting a vehicle acceleration response improvement condition as in S30.

Referring to FIG. 2, the monitoring data of the ECU 100 includes a coolant temperature for determination of engine cold, an engine speed (i.e., an engine revolution per minute (RPM)), a throttle valve operation time, a throttle valve opening angle, a flow rate of air, an intake manifold pressure, throttle valve front- and rear-end pressures, an air amount, an intake air temperature, a throttle valve flow rate, a throttle valve angle, and an operation time for response improvement. Furthermore, the ECU 10 detects the pressing of the accelerator pedal 9 by the APS and recognizes a driver's acceleration intention to switch into an acceleration control execution preparation state. The ECU 10 utilizes an engine coolant temperature, an engine speed, a throttle valve operation time, a throttle valve opening angle, and a flow rate of air as vehicle driving condition determination data.

Next, the ECU 10 performs a step of determining a vehicle driving condition as in S41 to S45, and performs an APS variation determination step (S50) and a rapid APS change determination step (S51) for determination of a rapid APS change. This is to more strengthen a vehicle state such that the excessive vibration of the throttle valve does not cause unstable engine power in the low-rotation region including engine idling when the driver operates the accelerator pedal or in the accelerator pedal operation in which the driver's acceleration intention is small.

Figure 3:
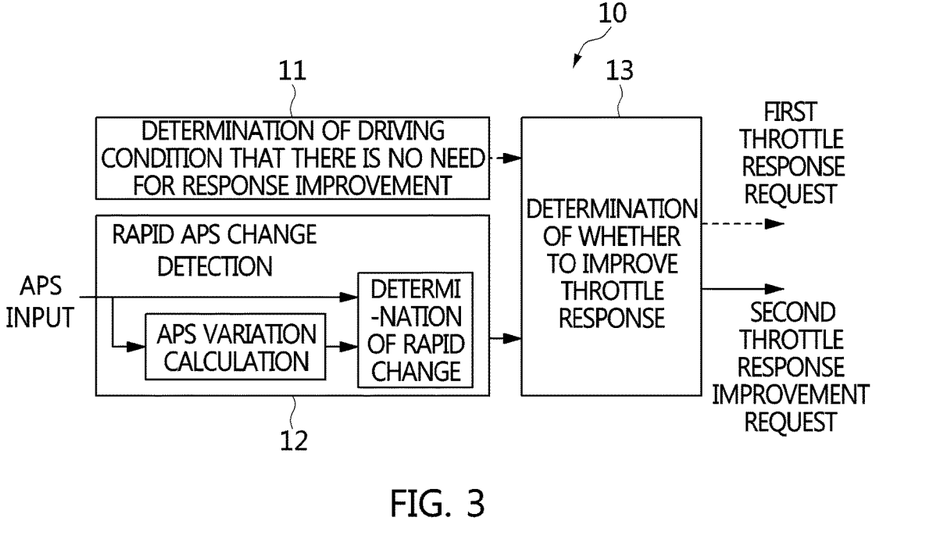
FIG. 3 is a diagram illustrating a configuration of an electronic control unit (ECU) for determining a throttle response improvement according to the exemplary embodiment of the present invention.

Referring to FIG. 3, the driving condition determination section 11 determines whether the engine is cold in the engine cold determination step (S41), whether the engine idles in the engine RPM determination step (S42), whether the throttle response operation time continues (i.e., the acceleration control is performed) in the step of determining the elapse of the throttle response operation time (S43), whether the desired air amount for acceleration control is exceeded in the step of determining the desired air amount according to the APS (S44), and whether the throttle valve for acceleration control is open by more than the reference value in the step of determining the reference value of the throttle valve according to the APS (S45). In practice, the ECU 10 determines the elapse of the throttle response operation time (S43) only when the APS variation is increased in the acceleration control execution state, and S44 and S45 may be set as an option to be omitted. As a result, the driving condition determination section 11 outputs the determination result corresponding to whether the engine is cold, the engine idles, the throttle response operation time continues, the desired air amount for acceleration control is exceeded, and the throttle valve for acceleration control is open by more than the reference value, to the dual acceleration control output section 13. The dual acceleration control output section 13 receives the output from the driving condition determination section 11 and outputs a stability request signal so that the acceleration control is switched into the first throttle response mode (S60-1).

On the other hand, the throttle response improvement determination section 12 performs the APS variation determination step (S50) and the rapid APS change determination step (S51) to reflect the driver's acceleration intention when the engine is not cold, the engine does not idle, the throttle response operation time does not continue, the desired air amount for acceleration control is not exceeded, and the throttle valve for acceleration control is not open by more than the reference value. The APS variation is determined by an APS increment per hour, and for example, an APS increment for 40 ms is used therefor. The rapid APS change is determined by a rapid APS change index determined by the current APS value and the APS variation, and for example, the rapid change index is extracted, selected, or determined from a two-dimensional map established by setting the current APS value as APS and the APS variation as dAPS. As a result, the throttle response improvement determination section 12 outputs the rapid APS change determination result to the dual acceleration control output section 13 as the rapid change index. The dual acceleration control output section 13 receives the output from the throttle response improvement determination section 12 and outputs a throttle response improvement request signal so that the acceleration control is switched into the second throttle response mode (S60).

Next, the ECU 10 performs the second throttle response mode (S60) by a second throttle response parameter determination (S70), a second throttle opening determination for required throttle response (S80) and desired manifold pressure (or predicted manifold pressure)-based throttle valve control (S90). On the other hand, the ECU 10 performs the first throttle response mode (S60-1) by a first throttle stability parameter determination (S70-1), a first throttle opening determination for required throttle stability (S80-1), and current manifold pressure (or measured manifold pressure)-based throttle valve control (S90-1).

Figure 4:
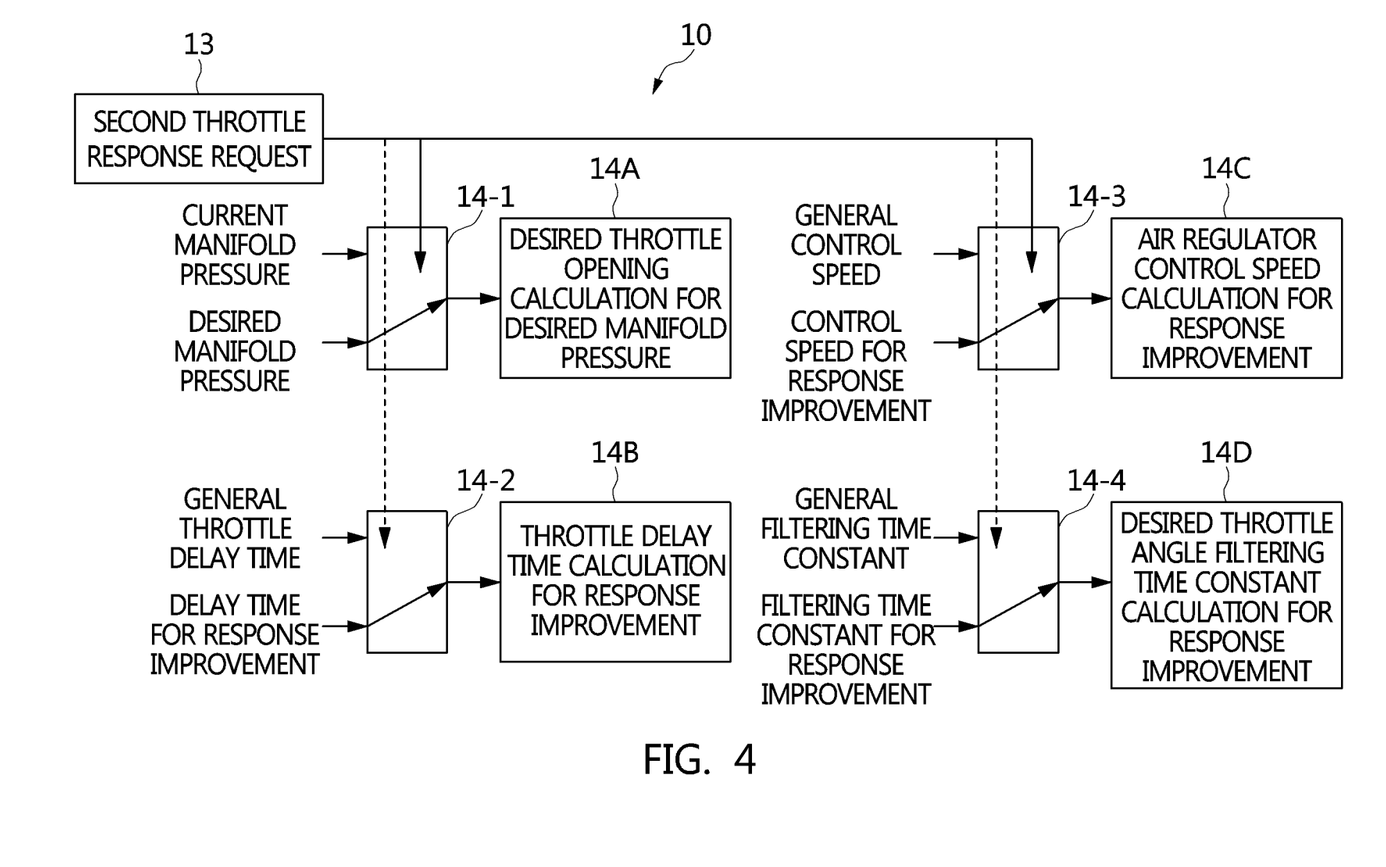
FIG. 4 is a diagram illustrating a configuration of an ECU for performing a second throttle response mode according to the exemplary embodiment of the present invention.

Referring to FIG. 4, the second throttle response parameter determination step (S70) utilizes a desired throttle opening, a throttle delay time, an air regulator control speed, and a desired throttle angle filtering time constant. For example, the desired manifold pressure according to the rapid APS change of the intake manifold pressure switching section 14-1 is output as a desired throttle opening determination value for response improvement through the throttle opening determination for response section 14A, the delay time for response improvement according to the rapid APS change of the throttle delay time switching section 14-2 is output as a throttle delay time determination value for response improvement thorough the throttle time determination for response section 14B, the control speed for response improvement according to the rapid APS change of the air regulator control speed switching section 14-3 is output as an air regulator control speed determination value for response improvement through the response speed determination section 14C, and the filtering time constant for response improvement according to the rapid APS change of the filtering time constant switching section 14-4 is output as a desired throttle angle filtering time constant determination value for response improvement through the throttle angle determination for response section 14D.

Figure 5:
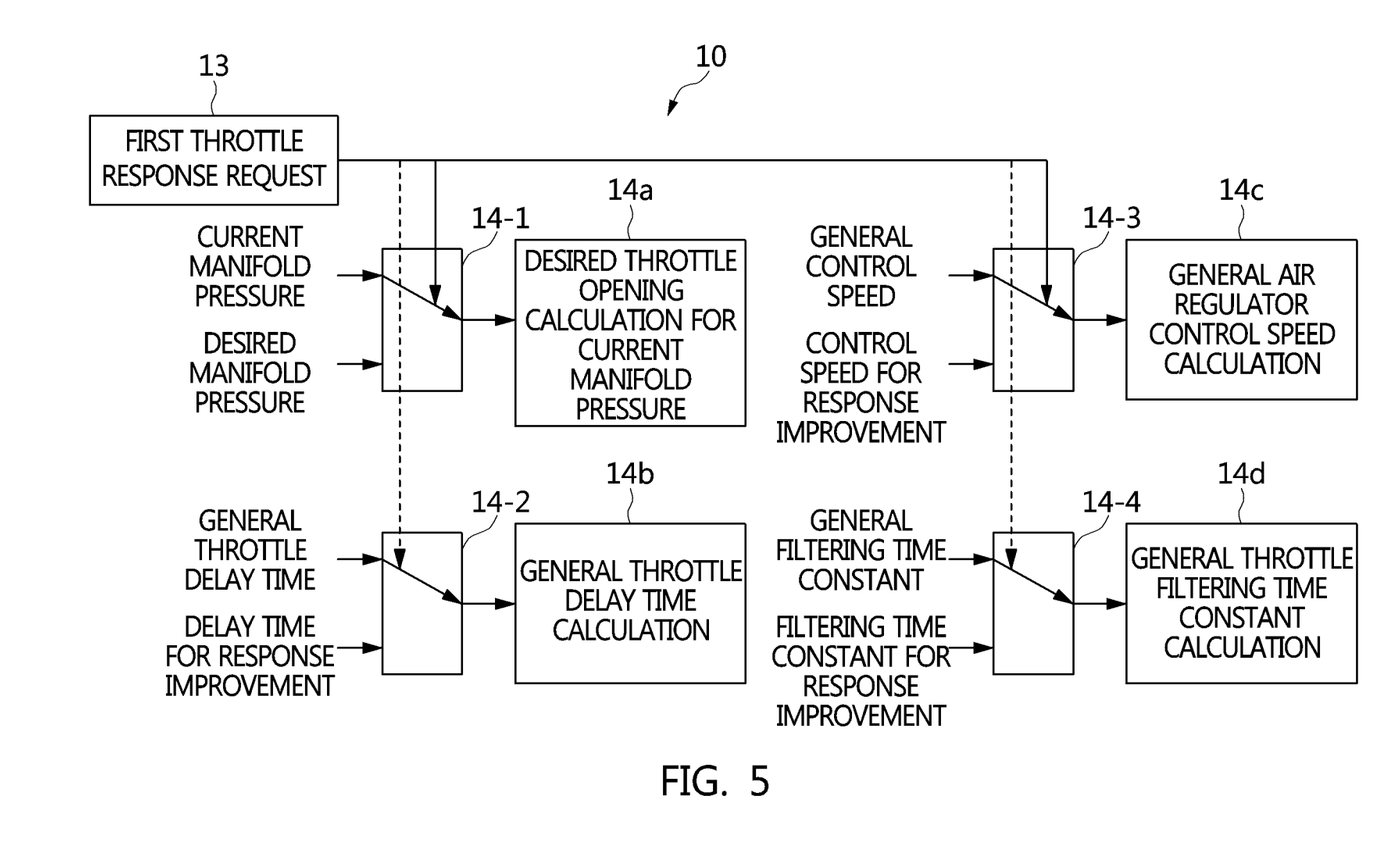
FIG. 5 is a diagram illustrating a configuration of an ECU for performing a first throttle response mode according to the exemplary embodiment of the present invention.

Referring to FIG. 5, the first throttle response parameter determination step (S70-1) utilizes a desired throttle opening, a throttle delay time, an air regulator control speed, and a desired throttle angle filtering time constant. For example, the current manifold pressure according to the APS variation of the intake manifold pressure switching section 14-1 is output as a desired throttle opening determination value for stability through the throttle opening determination for stability section 14a, the delay time for general improvement according to the APS variation of the throttle delay time switching section 14-2 is output as a throttle delay time determination value for stability improvement thorough the throttle time determination for stability section 14b, the control speed for general improvement according to the APS variation of the air regulator control speed switching section 14-3 is output as an air regulator control speed determination value for stability improvement through the stability speed determination section 14c, and the filtering time constant for stability improvement according to the APS variation of the filtering time constant switching section 14-4 is output as a desired throttle angle filtering time constant determination value for stability improvement through the throttle angle determination for stability section 14d. Here, since the term "general" means a conventional state, it is used as a contrastive meaning of "response". The determination value of "response" is less than that of "general".

Therefore, the second throttle response parameter determination step (S70) and the first throttle response parameter determination (S70-1) are performed in the same process, and they differ from each other in that the second throttle response parameter and the first throttle response parameter are used for them. In practice, the delay time for response improvement is used when there is a throttle delay time, and the delay time for response improvement may be a specific value which is less than the general throttle delay time or be a value that varies according to the driving condition. The control speed for response improvement is used when the air regulator 7 is used to reduce a difference between the desired air amount and the current air amount, and the control speed for response improvement is less than the general control speed. The filtering time constant for response improvement is used when filtering a desired throttle valve position, and the filtering time constant for response improvement may be a specific value which is less than the general filtering time constant or be a value that varies according to the driving condition.

Figure 6:
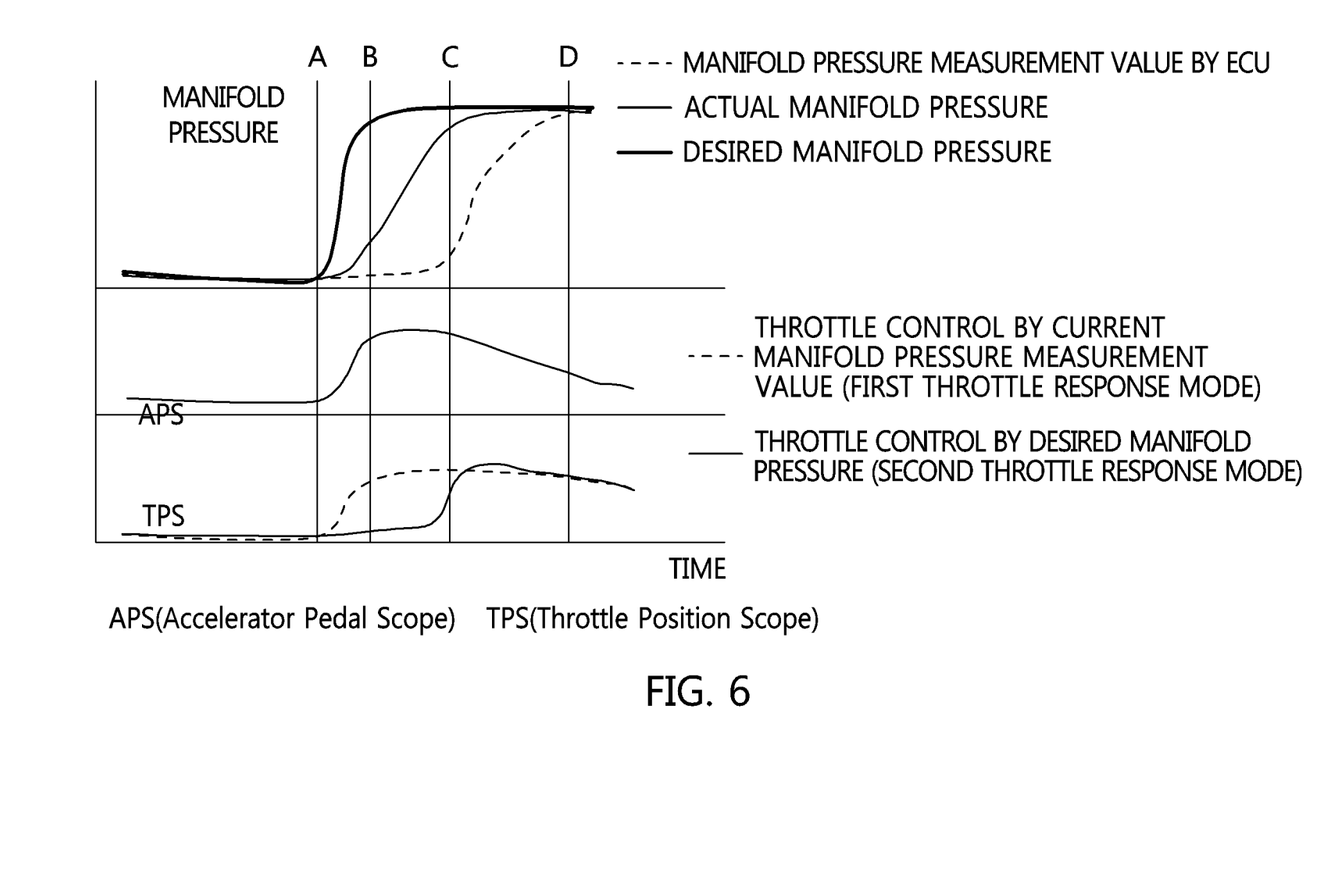
FIG. 6 is an example of a pressure-time diagram of an intake manifold according to the exemplary embodiment of the present invention.

Meanwhile, FIG. 6 illustrates a difference between a desired manifold pressure-based the second throttle response mode and a current manifold pressure-based the first throttle response mode. As illustrated in the drawing, the flow rate through the throttle valve is large when the difference between pressures at front and rear end portions of the throttle valve is large, and the flow rate through the throttle valve is small when the difference between the pressures is small. According to such a characteristic, the APS is rapidly increased at the time of A during rapid acceleration, but the engine speed (RPM) and the intake manifold pressure are low. Therefore, the throttle valve is slightly open due to the large pressure difference. The reason is because the ECU 10 determines that an air amount may be sufficiently supplied even when the throttle valve is slightly open.

Therefore, in the second throttle response mode (S60), the desired throttle opening may be increased faster by changing the intake manifold pressure, which is a reference for throttle opening determination, to be a desired value (or predicted value) which is increased faster than the actual intake manifold pressure. Thus, the output response is improved by rapidly increasing air supplied to the intake manifold. That is, when the intake manifold pressure (or predicted pressure) is used to control the throttle valve, the throttle valve largely reacts to the slight change of the APS.

On the other hand, in based the first throttle response mode (S60-1), the throttle valve is open slower than a required level using the current intake manifold pressure (or measured pressure) which is changed slower than the actual intake manifold pressure through noise filtering and signal processing of the intake manifold pressure measured by the ECU 10. That is, when the current intake manifold pressure (or measured pressure) is used to control the throttle valve, the throttle valve slightly reacts to the change of the APS.

Next, the ECU 10 performs the second throttle response mode in the second throttle opening determination for required throttle response step (S80) and the desired manifold pressure- (or predicted manifold pressure) based throttle valve control step (S90). Furthermore, the ECU 10 performs based the first throttle response mode in the based the first throttle opening determination for required throttle response step (S80-1) and the current manifold pressure- (or measured manifold pressure) based throttle valve control step (S90-1).

Figure 7:
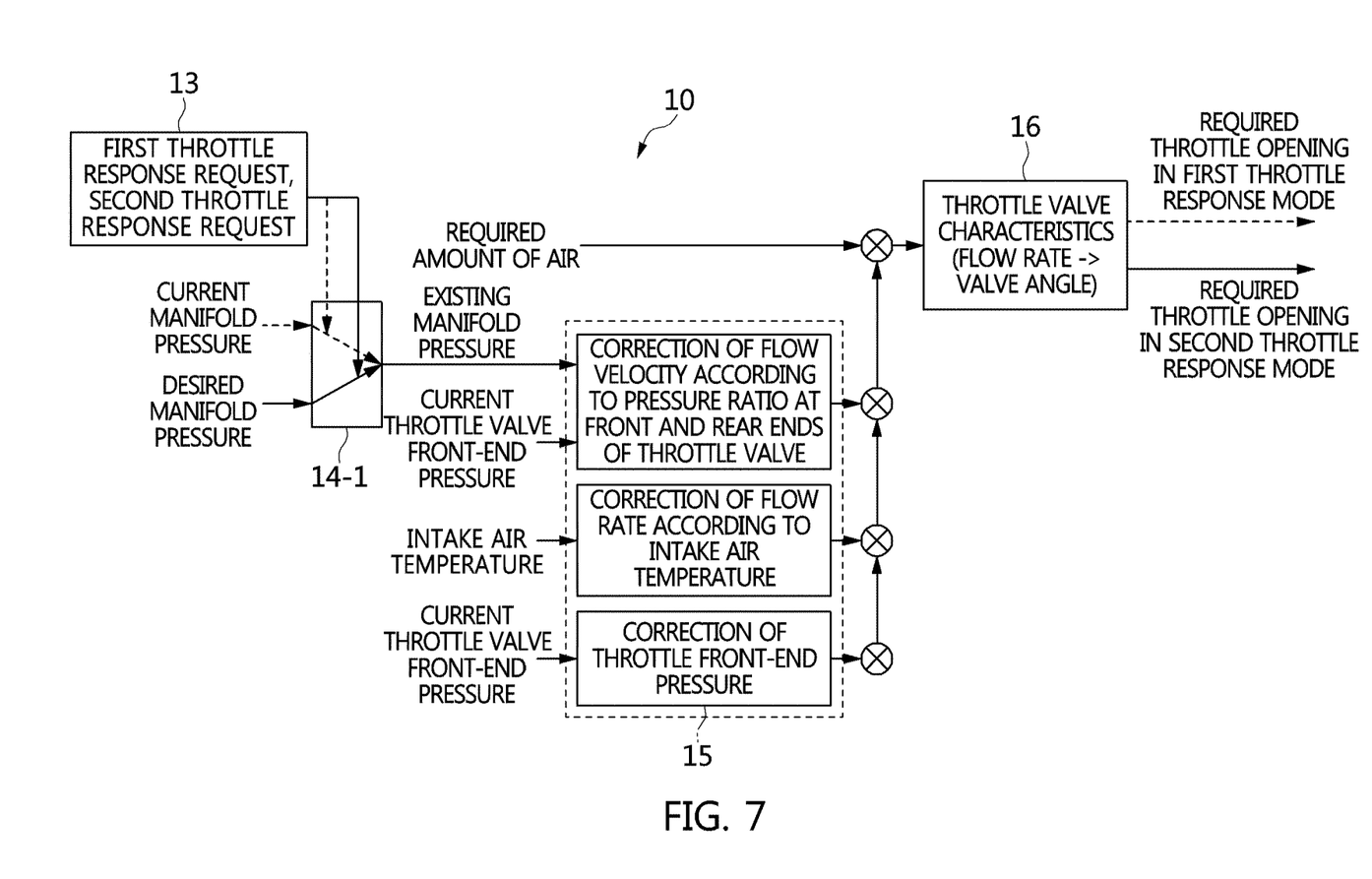
FIG. 7 is a diagram illustrating a configuration of an ECU for determining a required throttle opening from a required air amount according to the exemplary embodiment of the present invention.

Referring to FIG. 7, in the second throttle opening determination for required throttle response step (S80), the desired manifold pressure is input to a detection value correction section 15 through the intake manifold pressure switching section 14-1 so that an existing manifold pressure is changed to the desired manifold pressure. On the other hand, in the first throttle opening determination for required throttle response step (S80-1), the current manifold pressure is input to the detection value correction section 15 through the intake manifold pressure switching section 14-1 so that an existing manifold pressure is changed to the current manifold pressure. As such, the detection value correction section 15 corrects a flow velocity according to a pressure ratio at front and rear end portions of the throttle valve using the desired manifold pressure or current manifold pressure and the current throttle valve front-end pressure, a flow rate using the intake air temperature, and a throttle front-end pressure using the current throttle valve front-end pressure. The detection value correction section 15 outputs the corrected flow velocity, flow rate, and throttle front-end pressure values to a desired throttle opening determination section 16.

As such, the desired throttle opening determination section 16 applies the corrected flow velocity, flow rate, and throttle front-end pressure values to a required air amount, determines a desired throttle opening to be suitable for throttle valve characteristics that convert the flow rate into a valve angle, and classifies the desired throttle opening into a desired throttle opening in the second throttle response mode and a desired throttle opening in the first throttle response mode to output them. For example, the desired throttle opening for the required air amount is determined by multiplying the current manifold pressure corresponding to the rear end portion of the throttle, the pressure corresponding to the front end portion of the throttle, the temperature of intake air passing through the throttle, and the required air amount, and then determining the required throttle angle (i.e., required throttle valve opening angle) using the throttle valve characteristic data. To this end, the following Orifice Equation and Orifice Equation (inverse model) are used.

$$\dot{m}_{thr} = C_d A(\alpha_{thr}) \frac{P_{thr}}{\sqrt{R \cdot T_{thr}}} \Psi\left(\frac{P_{in}}{P_{thr}}\right) \quad \text{[Orifice Equation]}$$

where $\alpha_{thr}$: a throttle angle (%), $A(\alpha_{thr})$: an effective pass area of a throttle, $P_{thr}$: a pressure at an upper end portion of a throttle valve, $P_{in}$: manifold pressure, and $T_{thr}$: intake air temperature.

$$\alpha_{thr} = A^{-1}\left(\frac{\sqrt{R \cdot T_{thr}}}{C_d P_{thr} \Psi\left(\frac{P_{in}}{P_{thr}}\right)} \dot{m}_{thr}\right) \quad \text{[Orifice Equation (inverse model)]}$$

The desired manifold pressure (or predicted manifold pressure)-based throttle valve control step (S90) is performed by applying the desired throttle opening determination value as a second value of the throttle opening determination for response section 14A, the throttle delay time determination value as a second value of the throttle time determination for response section 14B, the air regulator control speed determination value as a second value of the response speed determination section 14C, the desired throttle angle filtering time constant determination value of the throttle angle determination for response section 14D thereto. Furthermore, the current manifold pressure (or measured manifold pressure)-based throttle valve control step (S90-1) is performed by applying the desired throttle opening determination value as a first value of the throttle opening determination for stability section 14a, the throttle delay time determination value as a first value of the throttle time determination for stability section 14b, the air regulator control speed determination value as a first value of the stability speed determination section 14c, the desired throttle angle filtering time constant determination value of the throttle angle determination for stability section 14d thereto.

As a result, the desired throttle opening control of the throttle valve 6 allows the engine response to be fast by the fast response of the throttle valve according to the second throttle response mode or prevents the throttle valve from excessively vibrating according to the first throttle response mode, preventing side effects of causing unstable engine power.

Next, the ECU 10 resets acceleration control according to reduction in the APS variation of the accelerator pedal 9, and ends the acceleration control when the APS is not detected.

As described above, in the acceleration control method through throttle dualization according to the present embodiment, when the electronic control unit (ECU) 10 determines whether the accelerator pedal scope (APS) is rapidly changed by the pressing of the accelerator pedal 9, the acceleration control using the current intake manifold pressure is switched into the second throttle response mode using the desired intake manifold pressure so that the acceleration control is performed. The ECU 10 classifies the desired throttle opening, the throttle delay time, the air regulator control speed, and the throttle angle filtering time constant into when the APS is rapidly changed and when the APS is not rapidly changed, and adjusts them. Thus, it is possible to prevent the excessive vibration of the throttle valve causing unstable engine power and to control the fast response of the throttle valve 6 for immediately reflecting the driver's acceleration intention.

The vehicle of the present invention has the following advantages and effects by performing acceleration control in a state in which it is divided into both response and stability of a throttle valve when a driver presses an accelerator pedal.

Firstly, when a driver's acceleration intention is large, the response of the throttle response is improved according to the required fast response of the driver so that the acceleration response of the vehicle is improved. Secondly, when the engine idles or the driver's acceleration intention is small, the throttle is stably controlled to prevent unstable engine power acting as dissatisfaction of the driver during acceleration control. Thirdly, since the throttle valve is stably controlled in most traveling state of the vehicle, the engine power and the engine revolution per minute (RPM) are stably controlled. Fourthly, since throttle control-related elements including a change of a manifold pressure, a change of a throttle valve control delay time, a change of a throttle valve control speed, and a change of a throttle valve filtering time constant, are used to control the response of the throttle valve, there is no cause of rising costs due to hardware including additional detectors and actuators. Fifthly, the performance of the vehicle can be improved by the fast response when the driver is intended, the merchantability of the vehicle can be improved by improvement in acceleration response, and they can be performed without additional detectors and actuators.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An acceleration control method through throttle dualization comprising;
    detecting a signal of an accelerator pedal scope (APS) by pressing of an accelerator pedal while a vehicle travels by an electronic controller determining whether the APS is changed faster than a predetermined value,
    performing a first throttle response mode in which the acceleration control is performed using a current intake manifold pressure when the APS is not determined to be changed faster than the predetermined value, and
    performing a second throttle response mode in which acceleration control is performed using a target intake manifold pressure when the APS is determined to be changed faster than the predetermined value.

2. The acceleration control method of claim 1, wherein the second throttle response mode includes:
    monitoring data of a driving condition according to the traveling of the vehicle by the electronic controller and detecting the APS;
    detecting an acceleration response improvement condition of the vehicle when the APS is detected, and determining that the APS is changed faster than the predetermined value, after the acceleration response improvement condition is satisfied;
    determining a first throttle response parameter according to the target intake manifold pressure after the APS is determined to be changed faster than the predetermined value;
    determining a first required throttle opening for throttle response using the first throttle response parameter; and
    controlling a throttle valve by the first required throttle opening for throttle response to perform the acceleration control.

3. The acceleration control method of claim 2, wherein the driving condition includes an engine coolant temperature, an engine revolution per minute (RPM), a throttle valve operation time, a throttle valve opening angle, a flow rate of air, an intake manifold pressure, pressures at front and rear end portions of the throttle valve, an air amount, an intake air temperature, and a throttle valve flow rate.

4. The acceleration control method of claim 2, wherein the acceleration response improvement condition includes an engine cold state, an engine speed, and an acceleration control operation, and the acceleration response improvement condition is not satisfied when an engine is cold or idles, or the acceleration control is performed.

5. The acceleration control method of claim 2, wherein the acceleration response improvement condition includes a target air amount and a reference value for opening of the throttle valve, and the acceleration response improvement condition is not satisfied when the target air amount is exceeded or the throttle valve is open by more than the reference value.

6. The acceleration control method of claim 2, wherein the determining that the APS is changed faster than the predetermined value, includes:
    determining an APS variation to a current APS value; and
    determining the change of the APS faster than the predetermined value by a APS change index for the APS variation.

7. The acceleration control method of claim 6, wherein the APS variation is an APS increment per hour, and the APS change index is determined from a map of the current APS value and the APS variation.

8. The acceleration control method of claim 2, wherein the first throttle response parameter is a target throttle opening.

9. The acceleration control method of claim 8, wherein the target throttle opening is a target throttle opening determination value for response improvement according to the target manifold pressure.

10. The acceleration control method of claim 8, wherein the first throttle response parameter further includes a throttle delay time, an air regulator control speed, and a target throttle angle filtering time constant.

11. The acceleration control method of claim 10, wherein the throttle delay time is a throttle delay time determination value for response improvement according to the change of the APS faster than the predetermined value, the air regulator control speed is an air regulator control speed determination value for response improvement according to the change of the APS faster than the predetermined value, and the target throttle angle filtering time constant is a target throttle angle filtering time constant determination value for response improvement according to the change of the APS faster than the predetermined value.

12. The acceleration control method of claim 2, wherein the first required throttle opening for throttle response is determined by applying a flow velocity correction value, a flow rate correction value, and a throttle front-end pressure correction value to a required air amount.

13. The acceleration control method of claim 1, wherein the first throttle response mode includes:
   monitoring data of a driving condition according to the traveling of the vehicle by the electronic controller and detecting the APS;
   detecting an acceleration response improvement condition of the vehicle when the APS is detected, and determining that the APS is not changed faster than a predetermined value, when the acceleration response improvement condition is not satisfied or after the acceleration response improvement condition is satisfied;
   determining a second throttle response parameter according to the current intake manifold pressure;
   determining a second required throttle opening for throttle stability using the second throttle response parameter; and
   controlling a throttle valve by the second required throttle opening for throttle stability to perform the acceleration control.

14. The acceleration control method of claim 13, wherein the determination value of the second throttle response parameter is greater than the first throttle response parameter determination value according to the throttle response modes.

15. A vehicle comprising:
   an electronic controller configured to detect an accelerator pedal scope (APS) by pressing of the accelerator pedal while the vehicle travels, to determine whether the APS is changed faster than a predetermined value, after determining an acceleration response improvement condition by an engine cold state, an engine speed, a target air amount, and a reference value for opening of a throttle valve, to determine a target throttle opening, a throttle delay time, an air regulator control speed, and a throttle angle filtering time constant according to a first throttle response mode using a target intake manifold pressure when the acceleration response improvement condition is satisfied or the APS is determined to be changed faster than the predetermined value, or to determine a target throttle opening, a throttle delay time, an air regulator control speed, and a throttle angle filtering time constant according to a second throttle response mode using a current intake manifold pressure when the acceleration response improvement condition is not satisfied or the APS is determined to not be changed faster than the predetermined value, and to perform acceleration control in the first throttle response mode or the second throttle response mode; and
   an engine system including the throttle valve which is controlled by the electronic controller and is provided in an intake manifold.

16. The vehicle of claim 15, wherein the electronic controller is connected to a mode control map, and an intake manifold pressure, pressures at front and rear end portions of the throttle valve, an air amount, an intake air temperature, a throttle valve flow rate, a throttle valve angle, and an operation time for response improvement are input, as data, to the mode control map.

17. The vehicle of claim 15, wherein the engine system further includes an air regulator, and the air regulator reduces a difference between a target air amount and a current air amount in the intake manifold.

18. The vehicle of claim 17, wherein the air regulator is a wastegate turbocharger (WGT) or a variable geometry turbocharger (VGT).

* * * * *